No. 751,424. PATENTED FEB. 2, 1904.
H. WISMEYER.
CONCENTRATOR.
APPLICATION FILED MAY 29, 1903.
NO MODEL. 2 SHEETS—SHEET 1.
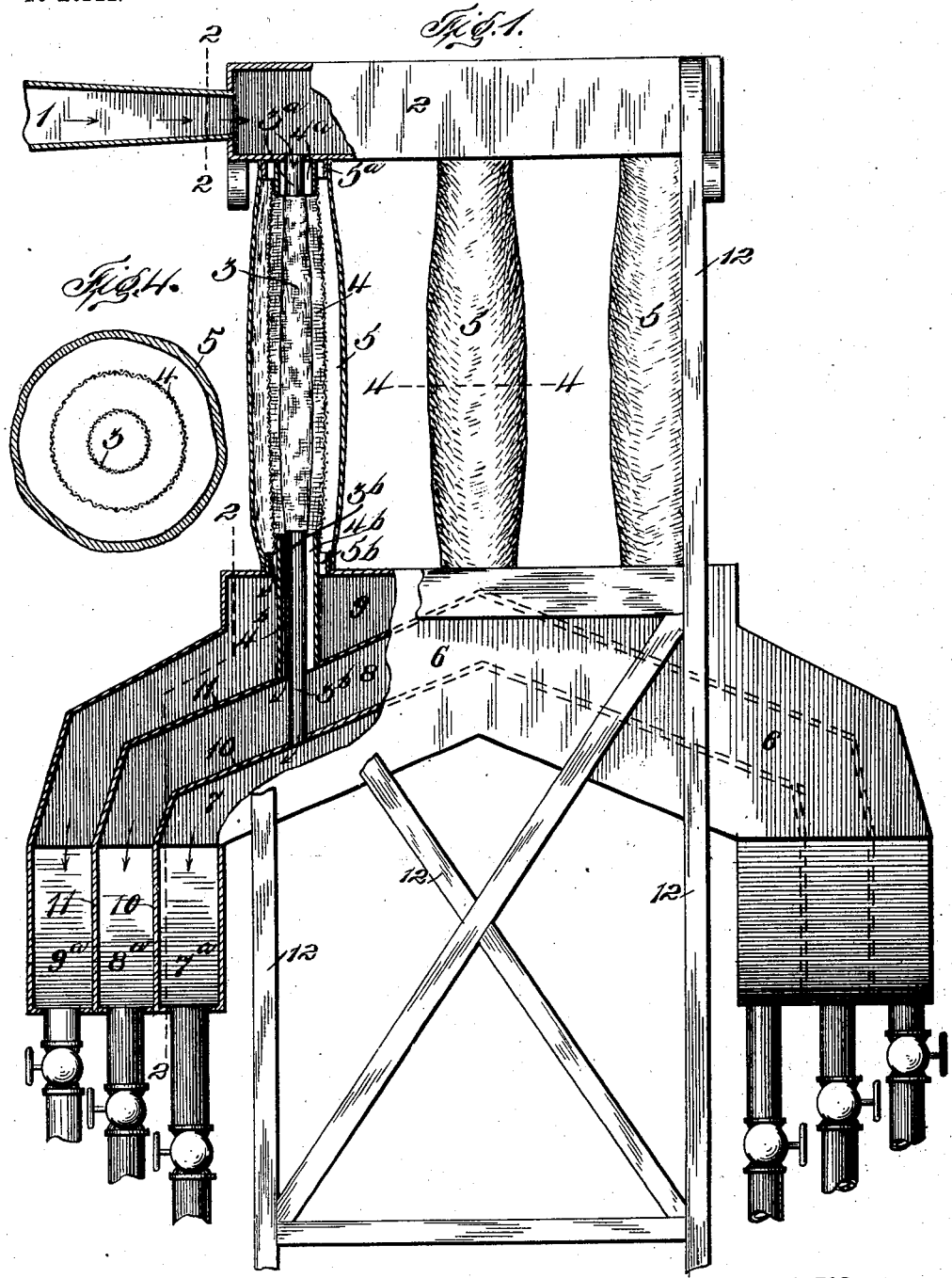
WITNESSES:
Wm. C. McKenzie
Amos W. Hart
INVENTOR
Henry Wismeyer,
BY Munn & Co.
ATTORNEYS.

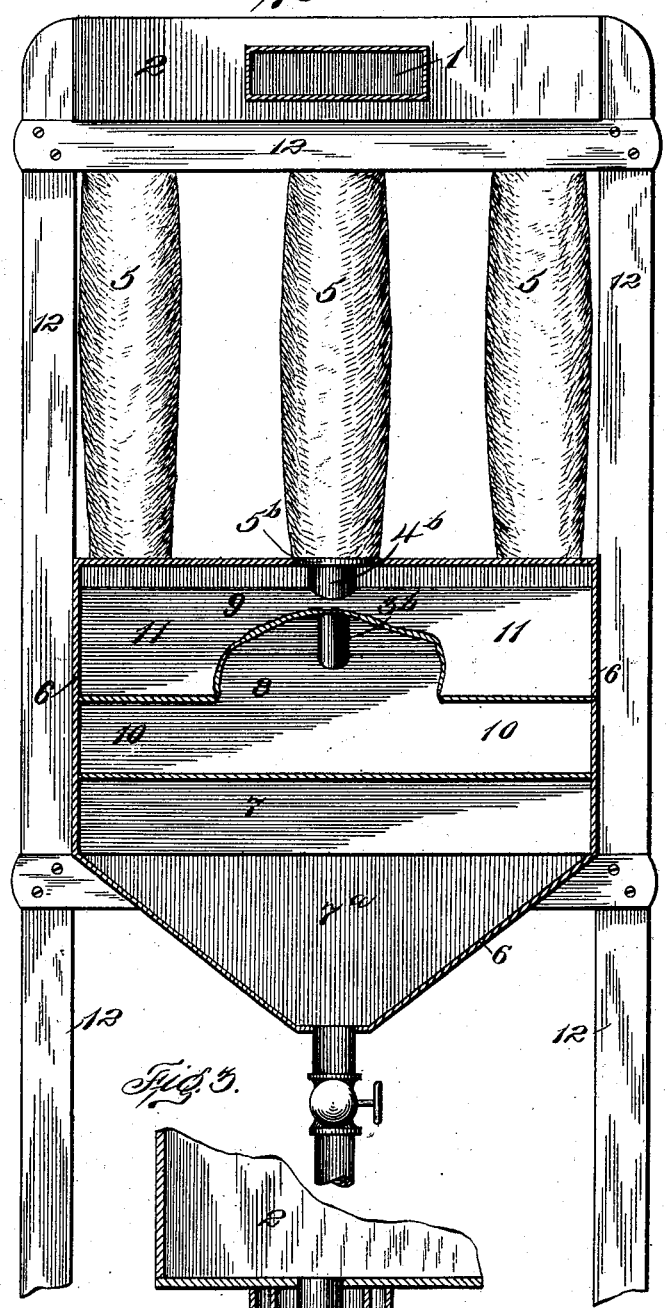

No. 751,424. Patented February 2, 1904.

UNITED STATES PATENT OFFICE.

HENRY WISMEYER, OF EMPORIA, KANSAS.

CONCENTRATOR.

SPECIFICATION forming part of Letters Patent No. 751,424, dated February 2, 1904.

Application filed May 29, 1903. Serial No. 159,280. (No model.)

*To all whom it may concern:*

Be it known that I, HENRY WISMEYER, a citizen of the United States, and a resident of Emporia, in the county of Lyon and State of Kansas, have made certain new and useful Improvements in Concentrators, of which the following is a specification.

My concentrator is adapted for treating auriferous ores, and particularly for concentrating fine or flour gold received from a separating-machine. In practice I employ it in connection with an improved separating-machine, for which I have filed an application for patent; but it is adapted for use with any machine in which a blast is produced capable of carrying over the fine gold and foreign substances with which it is mechanically mixed. The material thus carried over by the air-current is received into the distributing-chamber, whence it descends into conductors that are permeable to air, and which therefore permit escape of the air proper, while detaining the gold and foreign substances, which are both conveyed into a separator and grader having compartments and pockets in which the final concentration is effected, the products being graded according to quality and value.

The details of construction, arrangement, combination, and operation of parts are as hereinafter described, reference being had to accompanying drawings, in which—

Figure 1 is in part a side elevation and in part a vertical section of my improved concentrator. Fig. 2 is a vertical section on the line 2 2 of Fig. 1. Fig. 3, Sheet 2, is an enlarged detail section, which will be further referred to hereinafter. Fig. 4, Sheet 1, is an enlarged cross-section of one of the conductors on the line 4 4 of Fig. 1.

The pulverulent material to be treated, which consists of fine or flour gold mixed with pulverized quartz or other fine substances, is received through a tube 1 (see Fig. 1) into a distributing-chamber 2. From this chamber the material is forced by the blast of air downward into a series of tubes 3, which are permeable to air. As shown in Figs. 1 and 4, there are three such tubes arranged concentrically, the smaller tube 3 being surrounded by a tube 4 of finer mesh and the tubes 4 by other tubes 5 of still finer mesh. In practice I prefer to employ chamois leather for the outer tubes and different grades of bolting-cloth for the inner tubes 3 and 4. The several multitubular conductors thus formed connect the distributing-chamber 2 with the separator and grader 6. As indicated in Fig. 1, the inner tube 3 is attached to a tubular metal coupling $3^a$, (see Fig. 3,) which is pendent from the bottom of the distributer 2, and its lower end is attached to a corresponding tube $3^b$, which extends downward and connects with the lowest compartment 7 of the concentrator and grader 6. The upper ends of the tubes 4 and 5 are attached to tubular couplings $4^a$ and $5^a$, respectively, (see Fig. 3,) which are arranged concentrically with the coupling $3^a$, but which do not open into the distributing-chamber 2. The lower ends of the said tubes 4 and 5 are similarly attached to tubular couplings $4^b$ and $5^b$, respectively, which are arranged concentrically with the tube $3^b$ and communicate, respectively, with the compartments 8 and 9 of the grader and separator. The latter is constructed double—that is to say, it is duplicated in structure on each side of a vertical median line.

On each side there are two partitions, 10 and 11, which are inclined downward in their upper portions and vertical in their lower portions, as indicated in Fig. 1. These partitions are separated from each other and from the lower and upper walls of the casing or body of the grader, so as to form passages or compartments of about equal capacity. It will be seen that the lower ends of the compartments form, practically, pockets $7^a$, $8^a$, and $9^a$, which are severally provided with valved outlets as shown.

From the foregoing description the operation of my improved concentrator will be readily understood. A blast of due strength being artificially produced, it carries along with it the flour-gold and pulverulent foreign substances with which it is intimately mixed into the distributing-chamber 2, whence they are driven downward through the couplings $3^a$ into the inner tubes 3 of the conductors. These tubes being of comparatively coarse mesh allow the gold to pass through, while the coarser material, consisting principally or wholly of foreign substances, passes downward through the rigid tube $3^b$ into compartment 7, and thus finally into the pocket $7^a$.

The air escaping through the tube 3 and carrying with it the gold passes also through a finer mesh of the second tube 4 and finally through the still finer pores or interstices of the chamois tube 8. Such portion of the gold as is unable to pass through the tube 4 will be collected by it, while the finest will be detained only by the outer chamois tube 5. Since the tubes 4 and 5 communicate, respectively, with the compartments 8 and 9 of the grader 6, it is apparent that the gold detained by them will be separated into two grades and received into the compartments 8 and 9, respectively, whence they will be conducted downward into the pockets $8^a$ and $9^a$, respectively. In brief, the three pockets will receive their grades of material corresponding to the graded mesh of the three tubes 3, 4, and 5. In order to dislodge from the latter such gold which may adhere to their inner sides, it is only necessary to occasionally rap or tap them gently.

It will be seen that the strength or rapidity of flow of the air-current employed is practically determined by the capacity of the several tubes to allow its escape therefrom. In practice I employ a considerable number of the multitubular conductors before described, so that a sufficient escape is provided for the air carrying over the gold and other substances.

It is obvious that in place of duplicating the structure of the separator and grader 6 on each side, as indicated, the partitions 10 and 11 might be extended farther or beneath all the multitubular conductors instead of half of them. The duplicate structure is, however, preferred, since it provides two sets of pockets and is otherwise advantageous.

Any suitable vertical frame 12 may be employed for supporting the operative parts of the concentrator before described.

Having thus described my invention, what I claim is—

1. The improved concentrator comprising a distributing-chamber, a separator and grader having a series of compartments and pockets, a series of conductors arranged intermediately of said distributer and grader and composed of a series of concentric tubes which are permeable to air and graded in mesh as described, the inner tube alone communicating with the distributer and the other tubes being closed at the top and communicating separately with the respective compartments of the grader, substantially as described.

2. The improved concentrator, comprising a horizontal distributing-chamber, having a series of discharge-openings and a series of pendent couplings arranged concentrically with said openings, a series of multitubular conductors, each conductor comprising three concentric tubes which are permeable to air and graded in respect to mesh as described, the inner tube communicating directly with the distributing-chamber by means of the aforesaid openings and the two outer tubes being secured to the said concentric couplings; the separator and grader, arranged directly beneath the distributing-chamber, and having parallel partitions which are inclined downward and divide the chamber of the separator into several compartments, tubes arranged concentrically and communicating with the several compartments, the lower ends of the multitubular conductors being connected with the respective tubes, as described.

3. The improved concentrator, comprising a distributing-chamber, a series of multitubular conductors which are pendent therefrom and composed of concentric tubes that are permeable to air; the separator and grader arranged beneath the distributing-chamber and having within it parallel transverse partitions which diverge from the center downward at an obtuse angle, a series of pockets formed at the ends of the compartments produced by said partitions, and a series of concentric tubes communicating with the several compartments and the respective multitubular conductors, substantially as described.

HENRY WISMEYER.

Witnesses:
R. S. JENNINGS,
AMOS W. HART.